United States Patent
Wechsel et al.

(10) Patent No.: US 11,815,918 B2
(45) Date of Patent: Nov. 14, 2023

(54) PRESELECTION VALVE, HYDRAULIC VALVE ASSEMBLY AND HYDRAULIC CONTROL DEVICE

(71) Applicant: HAWE Hydraulik SE, Aschheim (DE)

(72) Inventors: Thomas Wechsel, Neubiberg (DE); Walter Steiler, Baldham (DE); Martin Heusser, Munich (DE)

(73) Assignee: HAWE Hydraulik SE, Aschheim (DE)

( * ) Notice: Subject to any disclaimer, the term of this patent is extended or adjusted under 35 U.S.C. 154(b) by 30 days.

(21) Appl. No.: 17/684,689

(22) Filed: Mar. 2, 2022

(65) Prior Publication Data
US 2022/0283597 A1 Sep. 8, 2022

(30) Foreign Application Priority Data

Mar. 8, 2021 (DE) ........................ 102021202207.3

(51) Int. Cl.
| | | |
|---|---|---|
| *G05D 16/10* | (2006.01) | |
| *F15B 13/02* | (2006.01) | |
| *G05D 16/04* | (2006.01) | |

(52) U.S. Cl.
CPC .......... *G05D 16/101* (2019.01); *F15B 13/02* (2013.01); *G05D 16/0404* (2019.01)

(58) Field of Classification Search
CPC .. G05D 16/101; G05D 16/0404; F15B 13/02; F15B 2211/65; F15B 2211/253; F15B 2211/651–654; F15B 2211/40507
See application file for complete search history.

(56) References Cited

U.S. PATENT DOCUMENTS

| | | | | |
|---|---|---|---|---|
| 4,024,710 A | * | 5/1977 | Zelle | F16H 61/47 60/449 |
| 6,712,176 B2 | * | 3/2004 | Zenker | B62D 5/30 91/509 |
| 7,854,115 B2 | * | 12/2010 | Pack | F15B 11/165 91/446 |
| 10,422,110 B2 | * | 9/2019 | Hatanaka | F15B 11/165 |
| 2002/0157389 A1 | * | 10/2002 | Tsuruga | E02F 9/2296 60/422 |

(Continued)

FOREIGN PATENT DOCUMENTS

EP 3093505 A1 11/2016

*Primary Examiner* — Jessica Cahill
(74) *Attorney, Agent, or Firm* — DINSMORE & SHOHL LLP

(57) ABSTRACT

A preselection valve is for a hydraulic valve assembly with a switching element, a pressure input line, a first pressure output line and a first load pressure line with a load pressure inlet and output. The switching element is switchable from neutral to a first switching position. The pressure input line is connected to the first pressure output line in the first position. The preselection valve has a second and third load pressure line and a load pressure increasing device. The second load pressure line branches off the pressure input line upstream of the switching element. The load pressure increasing device is connected to the third load pressure line, which connects the pressure increasing device to the first load pressure line. The second load pressure line is connected to the pressure increasing device in the first switching position and the second load pressure line is blocked in the neutral position.

20 Claims, 8 Drawing Sheets

(56) References Cited

U.S. PATENT DOCUMENTS

2005/0257519 A1* 11/2005 Jensen ................ F15B 11/003
  60/466
2012/0233996 A1* 9/2012 Quinnell ............... E02F 9/2296
  60/426
2018/0347153 A1 12/2018 Hatanaka et al.

* cited by examiner

PRESELECTION VALVE, HYDRAULIC VALVE ASSEMBLY AND HYDRAULIC CONTROL DEVICE

CROSS-REFERENCE TO RELATED APPLICATIONS

This application claims priority to German application 10 2021 202 207.3, filed Mar. 8, 2021, all of which is hereby incorporated by reference in its entirety.

FIELD OF THE INVENTION

The present invention relates to a preselection valve for a hydraulic valve assembly, a hydraulic valve assembly comprising such a preselection valve, and a hydraulic control device comprising a hydraulic valve assembly according to the invention.

BACKGROUND OF THE INVENTION

Such preselection valves are known from the prior art, for example from EP 3 093 505 A1. The known preselection valves have a switching element, a pressure input line, a first pressure output line and a first load pressure line with at least one load pressure inlet and at least one load pressure output. The switching element is switchable from a neutral position to at least a first switching position, wherein the pressure input line is connected to the first pressure output line in the first switching position of the preselection valve. A first group of hydraulic consumers or hydraulic elements, such as control spools, is regularly connected to the pressure output line. As an example, a hydraulic loading crane or a hydraulic boom may be controlled therewith.

In addition, the known preselection valves regularly have a further load pressure line which taps a load pressure signal from the pressure output line downstream of the switching element, which is signaled to the load pressure output via a channel in the switching element in the corresponding switching position. The terms "upstream" and "downstream" as used herein refer to a direction of flow from the pressure input line to the corresponding pressure output line. Generally, spool valves are regularly used as preselection valves. However, the use of poppet valves is also possible.

If, for example, a fixed displacement pump is used in the entire hydraulic control system to supply pressure, the load pressure signal is reported to a recirculating controller, for example a recirculating pressure compensator. Here, the load pressure signal, together with a preload pressure in the closing direction of the recirculating pressure compensator, acts against the pump pressure, which is usually signaled via a throttle in the opening direction.

The preload pressure is usually provided by a spring. In order to reduce the circulation quantity, the load pressure signal must therefore be sufficiently large in combination with the preload pressure. However, the preload pressure must have a certain amount so that there is sufficient basic pressure in the system, for example to switch the switching element hydraulically. Generally, preload pressures of more than 4 bar are used, in particular 9, 14 bar or 24 bar.

In order to generate a sufficiently high load pressure signal, EP 3 093 505 A1 suggests that a throttle be provided in the load pressure line downstream of the channel in the switching element. However, the disadvantage of this is that the channel itself also forms a hydraulic resistor and therefore the load pressure signal achieved is strongly quantity-dependent. In addition, the high preload pressures also mean that, under certain circumstances, the required quantity (l/min) does not reach the control spools downstream of the preselection valve due to backpressures generated in the system. This problem could be countered by a larger valve assembly, but this would then lead to higher costs and also to a higher weight.

Furthermore, higher preload pressures in mobile hydraulics are disadvantageous in terms of energy, especially when constant displacement pumps are used. The example of the loading crane is a good illustration of this. The fixed displacement pump is driven directly by the combustion engine of the vehicle equipped with the mobile hydraulics. In idle state, i.e. when the hydraulic consumers are not activated, the fixed displacement pump runs, with the volume delivered being fed directly into the tank via the recirculating pressure compensator. If, for example, the fixed displacement pump delivers 140 l/min at a preload pressure of 14 bar in idle state, this corresponds to an energy consumption of approx. 3.3 kW. Even a reduction of the preload pressure to 9 bar would reduce the energy consumption to approx. 2.1 kW for the same quantity. As already mentioned above, however, a mere reduction of the preload pressure is not possible without further ado.

SUMMARY OF THE INVENTION

Therefore, it is an object of the present invention to disclose a preselector valve for a hydraulic valve assembly that is more energy efficient in the idle state while allowing sufficient flow rate.

The solution of the task is achieved with the features disclosed herein. Advantageous further embodiments are also described.

The preselection valve for a hydraulic valve assembly according to the invention is distinguished from preselection valves known in the prior art in that the preselection valve has a second load pressure line, a third load pressure line and a load pressure increasing device for increasing the load pressure. The second load pressure line branches off from the pressure input line upstream of the switching element, and the load pressure increasing device is connected to the third load pressure line. The third load pressure line connects the load pressure increasing device to the first load pressure line, wherein the second load pressure line is connected to the load pressure increasing device in the first switching position and the second load pressure line is blocked in the neutral position.

The difference to the prior art is that the load pressure signal is tapped directly before the switching element and is not fed back through the switching element. Thus, the load pressure signal is independent of the quantity. According to the invention, the load pressure signal is increased by the load pressure increasing device only when the switching element is not in the neutral position. Thus, a lower overall basic pressure in the system or preload pressure can be selected, for example of 4 bar or less. On the one hand, this saves energy and, on the other hand, the desired quantities can be achieved at the control spools downstream of the preselection valve.

Preferably, the preselection valve comprises a fourth load pressure line, wherein the load pressure increasing device is connected to the fourth load pressure line and the fourth load pressure line opens into the first load pressure line in a junction. Preferably, the load pressure increasing device comprises at least a first hydraulic resistor and a second hydraulic resistor, wherein the first hydraulic resistor having flow applied to it via the switching element and wherein the second hydraulic resistor having flow applied to it via the third load pressure line. In this context, it is also conceivable that the at least one first hydraulic resistor is adjustable and/or that the second hydraulic resistor is adjustable. In particular, it is advantageous if the at least one first hydraulic resistor is a nozzle and/or if the second hydraulic resistor is a nozzle.

Via this linkage of hydraulic resistors or via the nozzle chain, the load pressure in the load pressure increasing device can be increased accordingly and forwarded via the first load pressure line. Consequently, the increased load pressure signal is present at the load pressure output. The adjustability of the hydraulic resistors or nozzles provides a particularly high degree of flexibility, since the load pressure can be increased by the desired amount as required. The tapped load pressure signal is thus increased in the load pressure increasing device independently of quantity and in a reproducible manner and reported to the load pressure output. By suitable selection of the diameters of the hydraulic resistors, an increase between 5 bar and 40 bar can thus be easily achieved. In addition, the use of hydraulic resistors has the advantage that they can be provided at low cost.

Preferably, the second hydraulic resistor is disposed in the first load pressure line or in the third load pressure line. This results in a particularly simply constructed preselection valve.

Alternatively, it is advantageous if the load pressure increasing device has a copy valve, the first load pressure line having a barrier between the load pressure inlet and the load pressure outlet and the third load pressure line branching off from the first load pressure line between the load pressure inlet and the barrier. In particular, it is advantageous if a proportional copy valve is used here. The copy valve "compares" the pump pressure reported via the second load pressure line with the load pressure reported via the third load pressure line and applied to the load pressure inlet and increases the total load pressure accordingly, which is then reported in particular via the fourth load pressure line to the load pressure outlet.

Preferably, the preselection valve has a second pressure output line, wherein the switching element can be switched from the neutral position to a second switching position, wherein the pressure input line is connected to the second pressure output line in the second switching position of the preselection valve. The second load pressure line is blocked in the second switching position and the second pressure output line is connected to the first load pressure line in the second switching position, so that the pressure present in the pressure input line is present at or reported to the load pressure output. This enables a second group of hydraulic consumers connected to the second pressure output line to be controlled via the preselection valve. Furthermore, it can be ensured that a sufficiently high load pressure is also signaled in a second switching position.

A preferred embodiment provides that the preselection valve comprises a fifth load pressure line and a second pressure output line, wherein the fifth load pressure line branches off from the pressure input line upstream of the switching element. The switching element is switchable from a neutral position to a second switching position, wherein the pressure input line is connected to the second pressure output line in the second switching position of the preselection valve. The fifth load pressure line is connected to the load pressure increasing device in the second switching position, wherein the second load pressure line is blocked in the second switching position and the fifth load pressure line is blocked in the first switching position. This enables a second group of hydraulic consumers connected to the second pressure output line to be controlled via the preselection valve. Here, as will be explained below, it is necessary that via a second load pressure inlet a second load pressure signal (of the second group of hydraulic consumers) is selectively signaled to the load pressure output via the load pressure increasing device.

For example, the supports of the vehicle equipped with the mobile hydraulics can be controlled in the second switching position. This ensures that the load pressure signal is also increased accordingly when the second pressure output line is activated via the preselection valve. In this context, it is also possible that an individual load pressure increase takes place for each switching position, for example by forming the first hydraulic resistor via a control edge in the switching element that differs between two switching positions.

Preferably, the load pressure increase by the load pressure increasing device is dependent on the amount and direction of the deflection of the switching element from the neutral position. This can be achieved, for example, by the first hydraulic resistor being integrated in the switching element and formed, for example, by a control edge. Depending on the proportional deflection of the switching element, a correspondingly higher load pressure is achieved. It is also possible that there are further switching positions in addition to the first switching position and/or the second switching position for controlling a second group of hydraulic consumers. For example, a third switching position can be provided after the second switching position, which provides a kind of "boost" function, i.e. when the switching element of the preselection valve is fully deflected, the overall load pressure is increased more than in the first switching position.

Preferably, the junction is a shuttle valve. The shuttle valve blocks either the fourth load pressure line or the part of the first load pressure line between the junction and the load pressure inlet, depending on where the higher load pressure is applied.

Furthermore, the solution of the task is achieved with a hydraulic valve assembly disclosed herein. The hydraulic valve assembly comprises an inventive preselection valve described above, as well as at least one control spool connected to the preselection valve.

If a second group of hydraulic consumers is to be controlled, the hydraulic valve assembly has a second load pressure inlet. The second load pressure inlet can, for example, be disposed on an end plate of the hydraulic valve assembly and may be connected to the first load pressure line or the load pressure line of the at least one control spool via a shuttle valve. It is also possible that the second load pressure inlet is connected to the second pressure output line and the load pressure increasing device is optionally connected to the second load pressure inlet or the third load pressure line, in particular via a shuttle valve. A load pressure signal of a subsequent valve assembly is thus reported via the second load pressure inlet, the load pressure signal being smaller than the pressure applied to the corresponding pressure output line.

The solution of the task is also achieved with a hydraulic control device disclosed herein. The hydraulic control device comprises a hydraulic valve assembly according to the invention and at least one hydraulic pump. The hydraulic pump is connected to the preselection valve, for example, via an input block, the input block having a supply regulator and the pressure present at the load pressure outlet being signaled to the supply regulator. The hydraulic pump is designed in particular as a fixed displacement pump. Alternatively, the hydraulic pump is designed as a variable displacement pump and is connected to the preselection valve, with the pressure present at the load pressure outlet being signaled to the variable displacement pump or the regulator of the variable displacement pump.

BRIEF DESCRIPTION OF THE DRAWINGS

The invention is explained in more detail below with reference to the embodiments shown in the figures. Here is schematically shown.

DETAILED DESCRIPTION OF THE INVENTION

Figure 1:
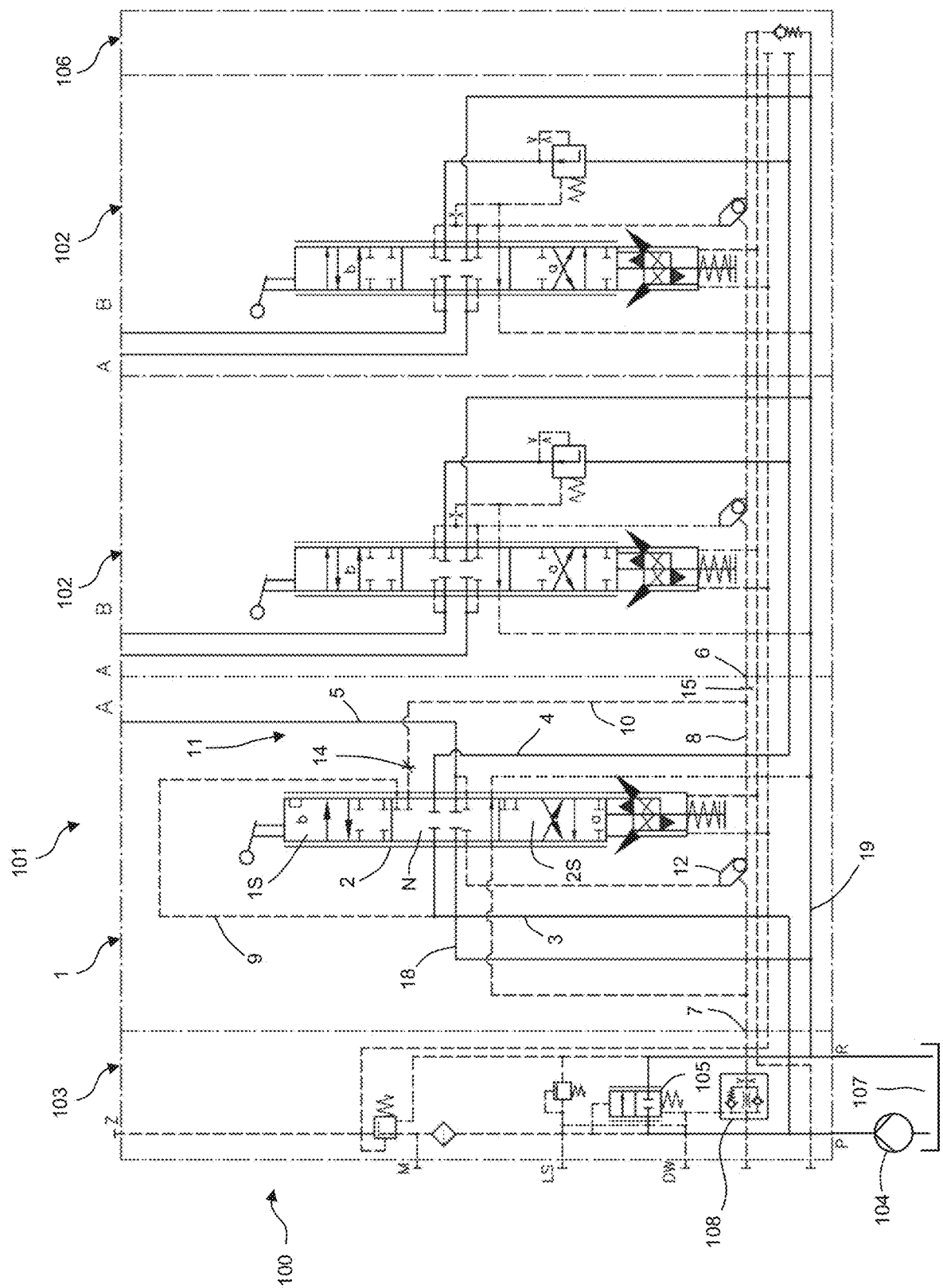
FIG. 1 is a hydraulic circuit diagram of a hydraulic control device according to the invention with a hydraulic valve assembly according to a first embodiment.

FIG. 1 shows a hydraulic circuit diagram of a hydraulic control device 100 according to the invention with a hydraulic valve assembly 101 according to a first embodiment. In this embodiment, the hydraulic valve assembly 101 comprises a preselection valve 1, as well as two control spools 102 connected downstream thereof. The preselection valve 1 is a proportional spool valve with a switching element 2 formed as a spool. In this embodiment, the spool 2 can be proportionally deflected from a neutral position N to a first switching position 1S(b) and a second switching position 2S(a). The preselection valve 1 has a pressure input line 3 and two pressure output lines 4, 5, wherein the pressure input line 3 is connected to a first pressure output 4 of the two pressure output lines in the first switching position 1S and to a second pressure output 5 of the two pressure output lines in the second switching position 2S. In the neutral position N, both the pressure input line 3 and the two pressure output lines 4, 5 are blocked. A first group of hydraulic consumers, for example a loading crane or a boom of a mobile hydraulic system, is controlled via the first pressure output line 4 (and consequently via the control spools 102). A second group of hydraulic consumers is controlled via the second pressure output line 5, for example the supports of a vehicle equipped with mobile hydraulics.

Furthermore, the preselection valve 1 comprises a return line 18, which is connected to the second pressure output line 5 in the first switching position 1S and to the first pressure output line 4 in the second switching position 2S. The return line 18 opens into a common return passage 19, via which in conventional manner also the control spools 102 are connected and relieved to a tank 107.

The preselection valve 1 includes a first load pressure line 8 that is part of the load pressure signal circuit of the hydraulic valve assembly 101. The first load pressure line 8 comprises a load pressure inlet 6, via which a load pressure applied to the control spools 102 can be signaled. The first load pressure line 8 further comprises a load pressure output 7, via which the highest load pressure of the hydraulic valve assembly 101 can be reported further, in particular to a supply regulator 105. Furthermore, the preselection valve comprises a second load pressure line 9 and a third load pressure line 10. The second load pressure line 9 branches off from the pressure input line 3 upstream of the spool 2 and is connected to a load pressure increasing device 11 in the first switching position 1S. The load pressure increasing device 11 is connected to the third load pressure line 10, which connects the load pressure increasing device 11 to the first load pressure line 8. In the neutral position N of the spool 2, the second load pressure line 9 is blocked. Similarly, the second load pressure line 9 is blocked in the second switching position 2S of the spool 2. In the second switching position 2S, the second pressure output line 5 is connected to the first load pressure line 8 by the spool via a junction 12 provided as a shuttle valve.

In this embodiment, the load pressure increasing device 11 comprises a first hydraulic resistor 14 and a second hydraulic resistor 15. The first hydraulic resistor 14 and the second hydraulic resistor 15 are formed as nozzles, wherein the first hydraulic resistor 14 is an adjustable nozzle. Flow is applied to the first nozzle via the spool 2 in the first switching position 1S and flow is applied to the second nozzle 15 via the third load pressure line 10 and the second nozzle 15 is arranged in the first load pressure line 8 between the junction of the third load pressure line 10 and the load pressure inlet 7. This nozzle chain can be used to raise the load pressure in the system and thus reduce the preload pressure. It is possible that the second nozzle 15 has a (fixed) diameter of 0.6 mm, for example. Depending on how the first nozzle 14 is set, an increased load pressure signal can thus be generated overall. In particular, by varying the diameter of the first nozzle 14 between, for example, 0.6 mm and 0.8 mm, a load pressure increase of approximately 5 bar to 40 bar can be achieved.

Furthermore, the hydraulic control device 100 shown in FIG. 1 has an input block 103, an end plate 106 and a hydraulic pump 104 provided as a fixed displacement pump. The hydraulic pump 104 is connected to the preselection valve 1 via the input block 103. The load pressure applied to the load pressure outlet 7 of the preselection valve 1 is reported to the supply regulator 105 provided as a recirculating pressure compensator. Depending on the load pressure, part of the quantity delivered by the hydraulic pump 104 is thus fed directly back into the tank 107. To suppress possible vibrations, the inlet block 103 also has a damping unit 108 connected upstream of the recirculating pressure compensator 105. It is of course also possible that a variable displacement pump is used instead of the fixed displacement pump, in which case the load pressure is reported directly to a pump controller or regulator of the variable displacement pump.

For lucidity reasons, only the hydraulic valve assembly and possibly the configuration of the end plate 106 will be described in the embodiments described below.

Figure 2:
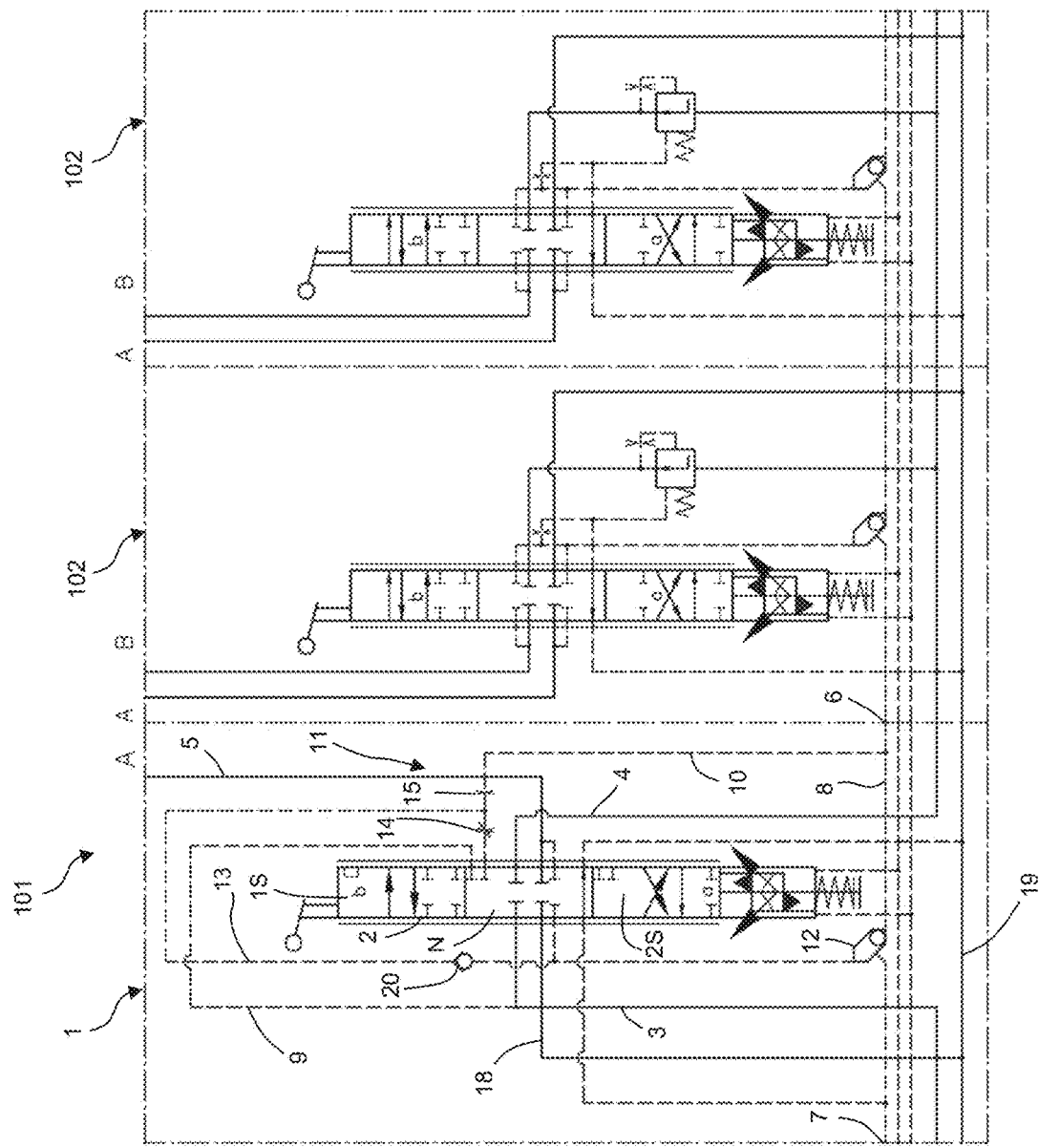
FIG. 2 is a hydraulic circuit diagram of a hydraulic valve assembly according to the invention according to a second embodiment.

FIG. 2 shows a hydraulic circuit diagram of a hydraulic valve assembly 101 according to the invention in accordance with a second embodiment. The hydraulic valve assembly 101 shown in FIG. 2 differs from the hydraulic valve assembly shown in FIG. 1 in that a fourth load pressure line 13 with a check valve 20 is provided. The fourth load pressure line 13 connects the load pressure increasing device 11 to the first load pressure line 8 via the shuttle valve 12. The check valve 20 is arranged upstream of the connection of the second pressure output line 4 to the shuttle valve 12 which is active in the second switching position 2S, as viewed in the direction of flow from the load pressure increasing device 11 to the shuttle valve 12. The check valve 20 prevents the load pressure signal tapped from the second pressure output line 4 from flowing to the load pressure increasing device 11 via the fourth load pressure line 13 in the second switching position 2S. Furthermore, the second nozzle 15 is arranged in the third load pressure line 10.

Figure 3:
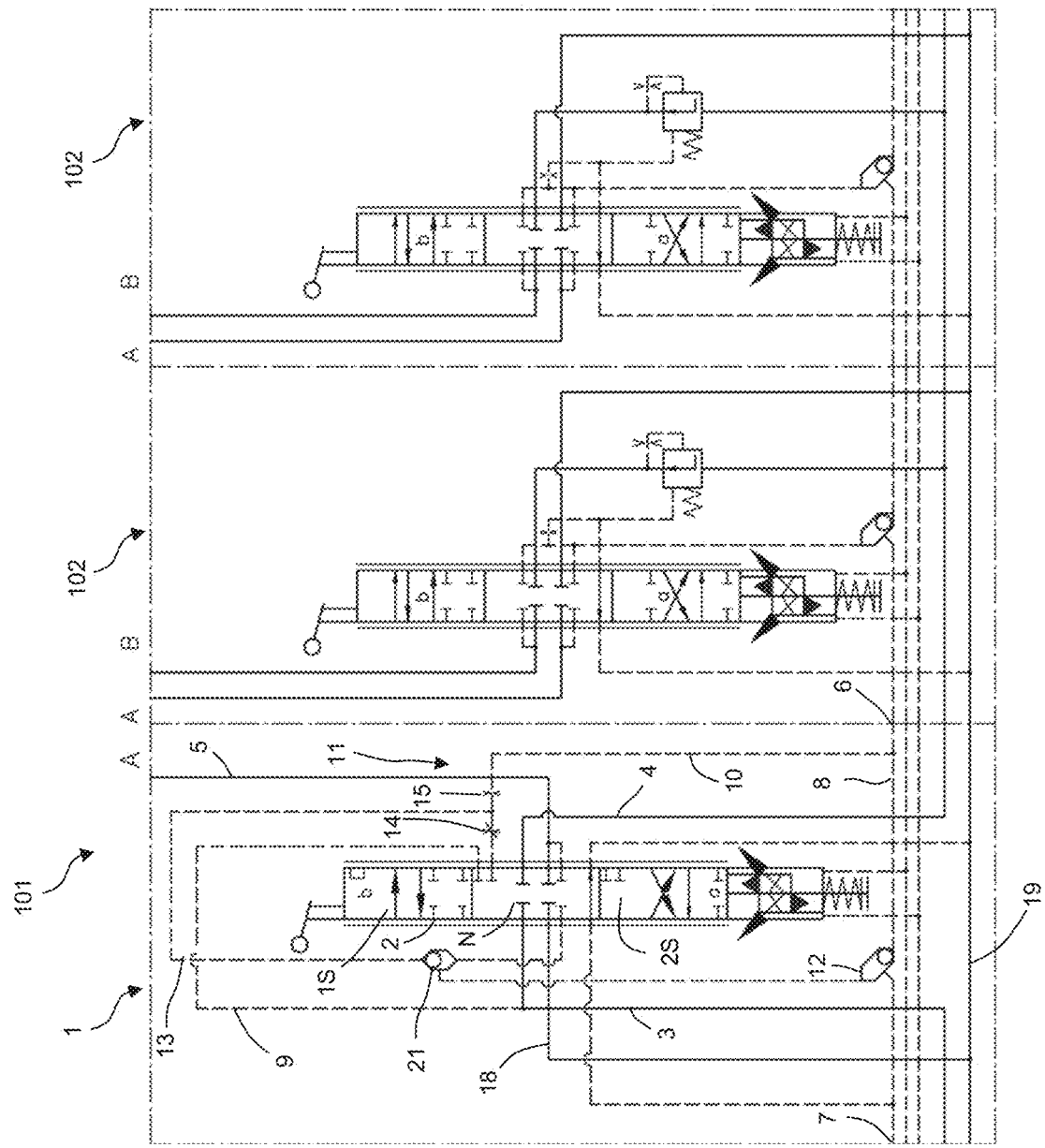
FIG. 3 is hydraulic circuit diagram of a hydraulic valve assembly according to the according to a third embodiment.

FIG. 3 shows a hydraulic circuit diagram of a hydraulic valve assembly 101 according to the invention in accordance with a third embodiment. The hydraulic valve assembly 101 shown in FIG. 3 differs from the hydraulic valve assembly shown in FIG. 2 in that a shuttle valve 21 is provided instead of the check valve disposed in the fourth load pressure line. The shuttle valve 21 also prevents the load pressure signal tapped from the second pressure output line 4 in the second switching position 2S from flowing to the load pressure increasing device 11 via the fourth load pressure line 13.

Figure 4:
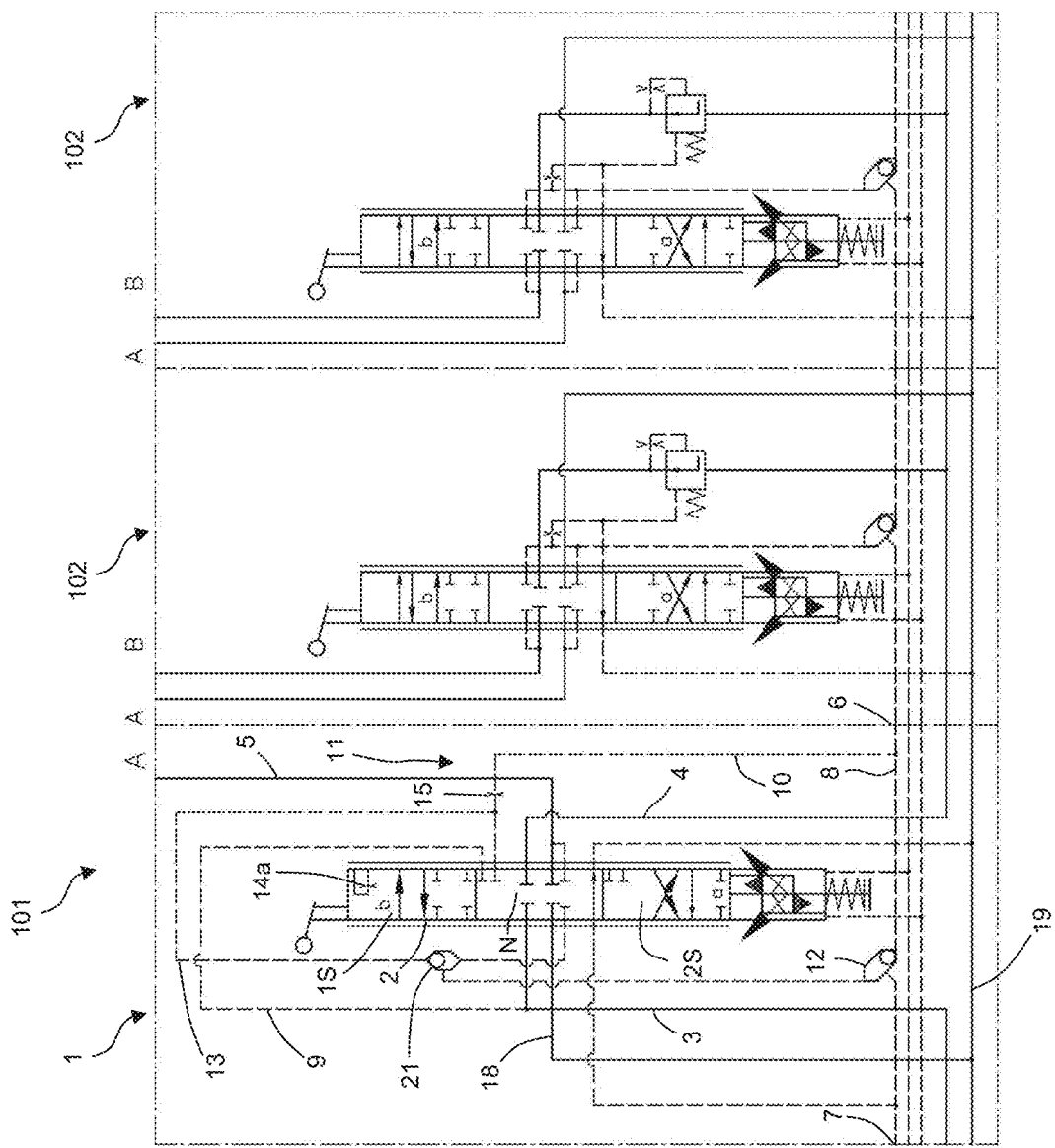
FIG. 4 is hydraulic circuit diagram of a hydraulic valve assembly according to the invention, according to a fourth embodiment.

FIG. 4 shows a fourth embodiment of a hydraulic valve assembly 101 according to the invention. The hydraulic valve assembly 101 shown in FIG. 4 differs from the hydraulic valve assembly described with reference to FIG. 3 in that the first nozzle 14a of the load pressure increasing device 11 is not arranged downstream of the spool 2, but is part of the spool 2. The first nozzle 14a can be formed, for example, by a control edge of the spool 2, so that a higher load pressure is achieved as a function of the proportional deflection of the spool 2.

Figure 5:
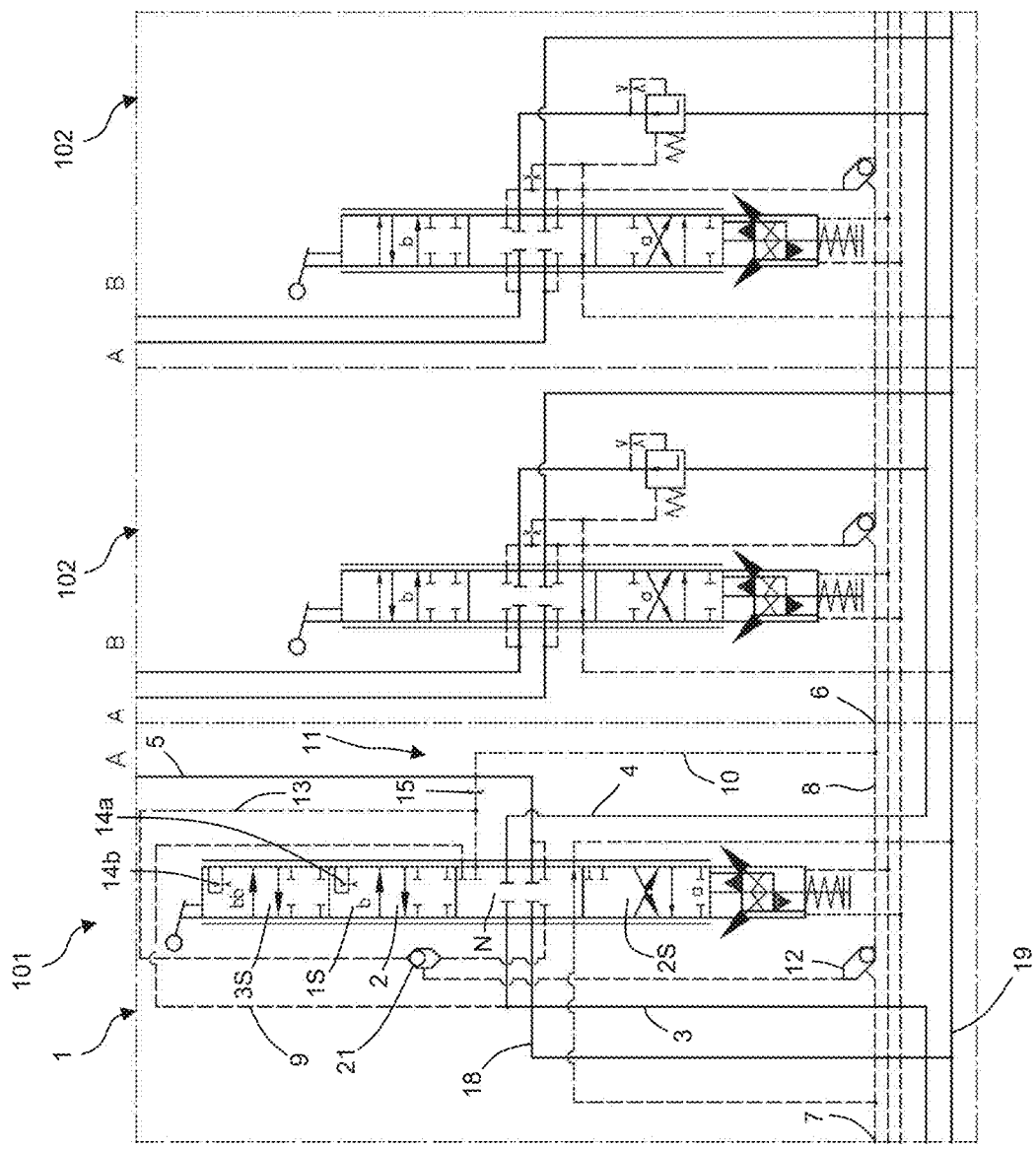
FIG. 5 is a hydraulic circuit diagram of a hydraulic valve assembly according to the invention, according to a fifth embodiment.

FIG. 5 shows a hydraulic circuit diagram of a hydraulic valve assembly 101 according to the invention in accordance with a fifth embodiment. The difference to the hydraulic valve assembly shown in FIG. 4 is that a third switching position 3S(bb) of the spool 2 is provided. The third switching position 3S is subsequent to the first switching position 1S and corresponds to a "boost" function. As shown, in the third switching position 3S, the load pressure signal reported via the second load pressure line 9 is increased in the load pressure increasing device 11. For this purpose, a first nozzle 14b is active in the third switching position 3S, which differs from the first nozzle 14a active in the first switching position 1S in that the diameter is larger. Thus, the load pressure is increased more in the third switching position 3S than in the first switching position 1S.

Figure 6:
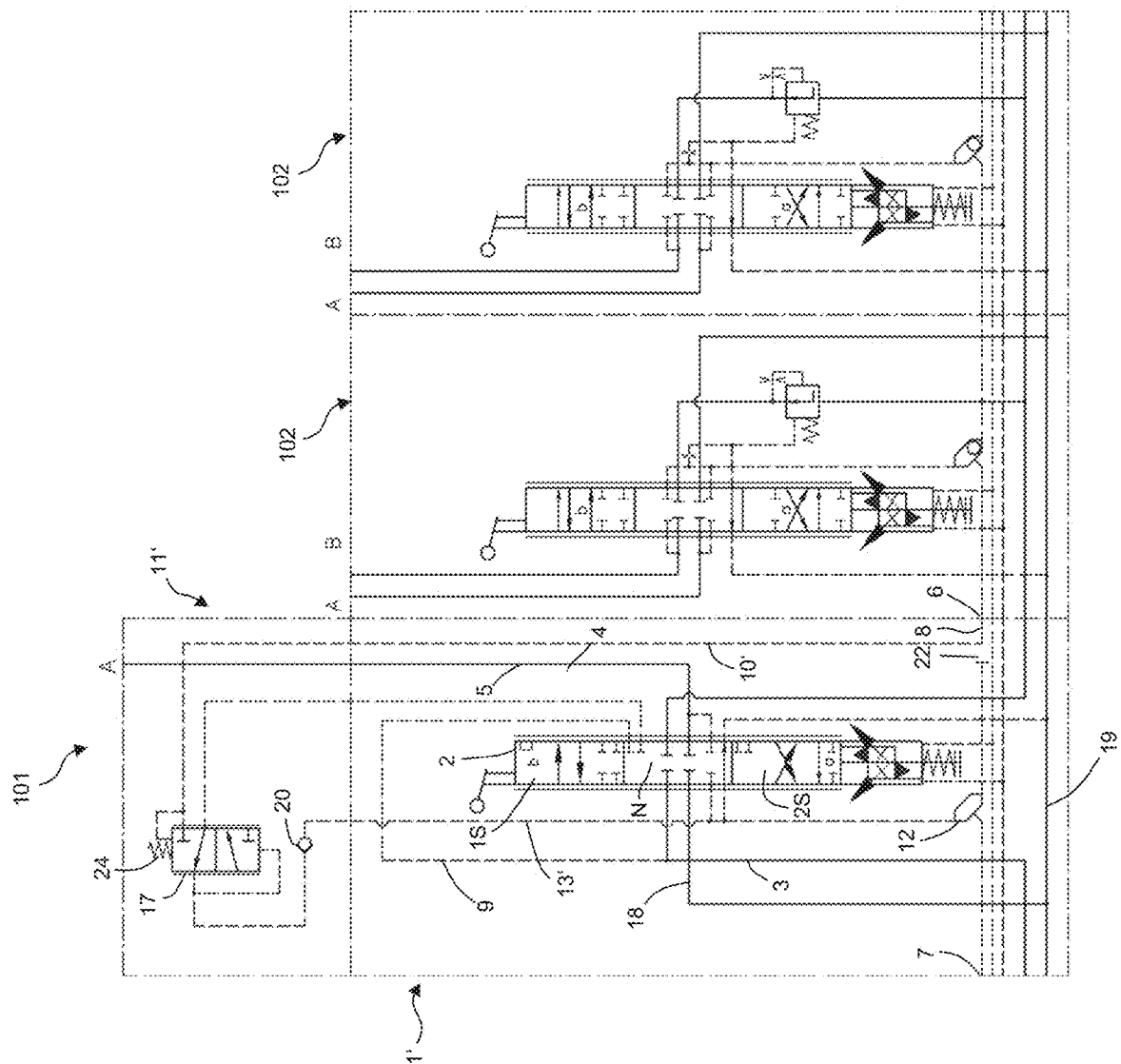
FIG. 6 is a hydraulic circuit diagram of a hydraulic valve assembly according to the invention according to a sixth embodiment.

In the following, a sixth embodiment of a hydraulic valve assembly 101 according to the invention is now described with reference to FIG. 6. This embodiment differs from the embodiments shown in FIGS. 1 to 5 in the structure of the preselection valve 1'. In particular, the difference is that the load pressure increasing device 11' of the preselection valve 1' does not have hydraulic resistors, but a copying valve 17. The copying valve 17 is connected to the first load pressure line 8 via the third load pressure line 10', wherein a barrier 22 interrupts the first load pressure line 8 between the junction 12 and the branch of the third load pressure line 10'. Consequently, the load pressure reported via the load pressure inlet 6 is always routed via the copying valve 17. As shown, in the first switching position 1S of the spool 2, the copying valve 17 "compares" the pressure prevailing in the pressure input line 3 and reported via the second load pressure line 9 with the load pressure applied to the load pressure inlet 6 and reported via the third load pressure line 10' with respect to the increased load pressure reported in the fourth load pressure line 13'. For this purpose, the copy valve 17 has a spring device 24 which acts together with the load pressure applied in the third load pressure line 10'. The increased load pressure is then reported to the load pressure outlet 7 of the first load pressure line 8 via the fourth load pressure line 13' and the junction 12, depending on whether the increased load pressure is higher than the load pressure present at the load pressure inlet 6. It is possible that a check valve 20 is disposed in the fourth load pressure line 13' between the copying valve 17 and the inlet 12 to prevent a backflow to the copying valve 17 in the second switching position 2S.

In the second switching position 2S of the spool 2, the pressure input line 3 is directly connected to the third load pressure line 10 and the second load pressure line 9 is blocked. Thus, the pump pressure is reported directly as the load pressure.

Figure 7:
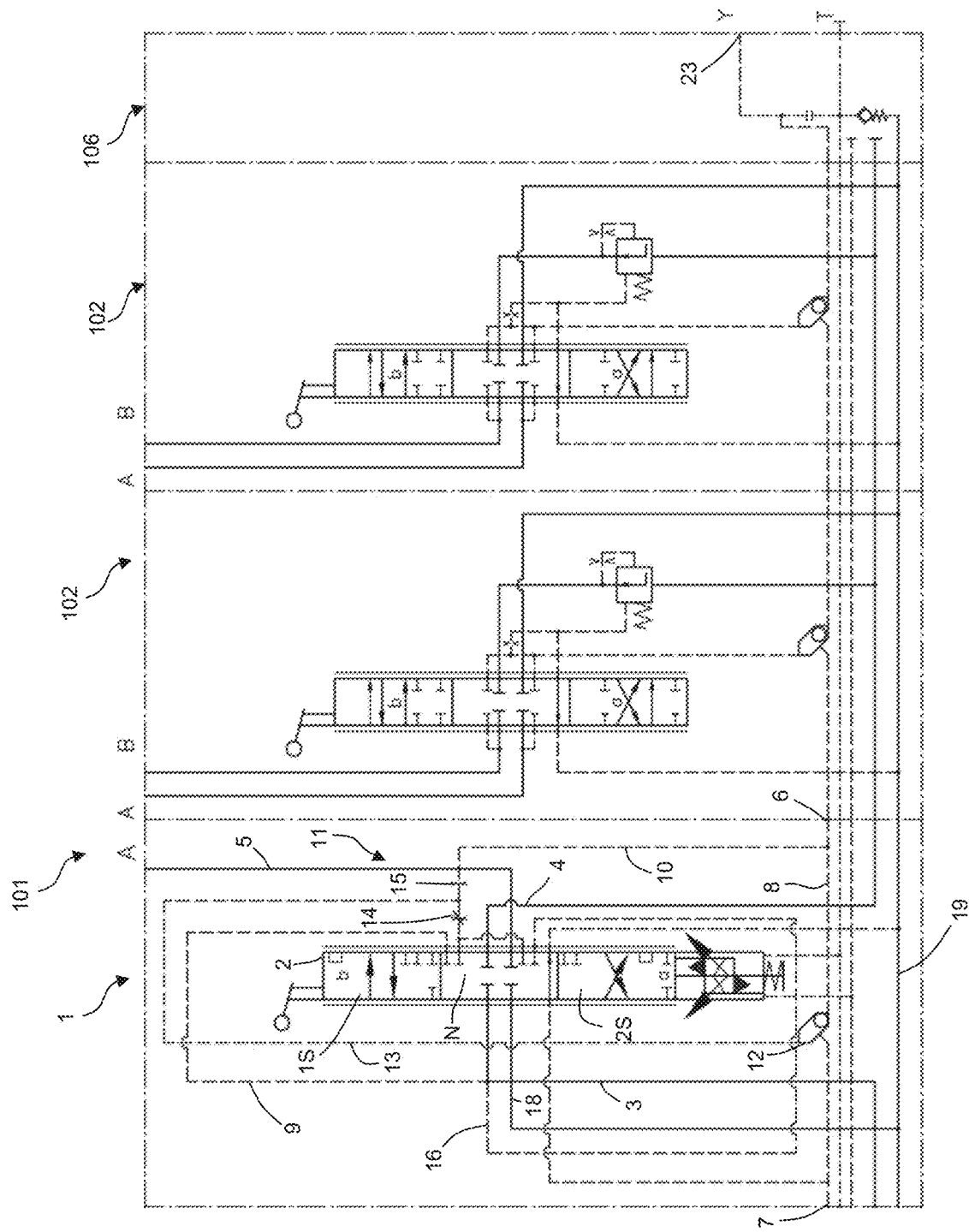
FIG. 7 is a hydraulic circuit diagram of a hydraulic valve assembly according to the invention according to a seventh embodiment.

FIG. 7 shows a seventh embodiment of a hydraulic valve assembly 101 according to the invention. In this embodiment, a load pressure increase occurs in both switching positions 1S and 2S of the spool 2. The load pressure increase in the first switching position 1S corresponds to the load pressure increase as described with reference to FIG. 3. In addition, the preselection valve 1 has a fifth load pressure line 16, which also branches off from the pressure input line 3 upstream of the spool 2. In the first switching position 1S, the fifth load pressure line 16 is blocked, and in the second switching position 2S, the fifth load pressure line 16 is connected to the load pressure increasing device 11, in which case the second load pressure line 9 is blocked. Furthermore, the hydraulic valve assembly 101 comprises a second load pressure inlet 23, which in this embodiment example is dipsosed in the end plate 106. Via the second load pressure inlet 23, the load pressure of the second group of hydraulic consumers is signaled, so that load pressure applied to the load pressure inlet 6 of the preselection valve 1 always is the load pressure of the group of hydraulic consumers controlled via the spool 2. Consequently, the load pressure of the controlled group of hydraulic consumers is increased by the load pressure increasing device 11. Of course, it is also conceivable in this regard that the load pressure increasing device 11 is configured as shown in FIG. 4 or FIG. 5. It is also conceivable that a "boost" switching position is provided alternatively or additionally for the second group of hydraulic consumers.

Figure 8:
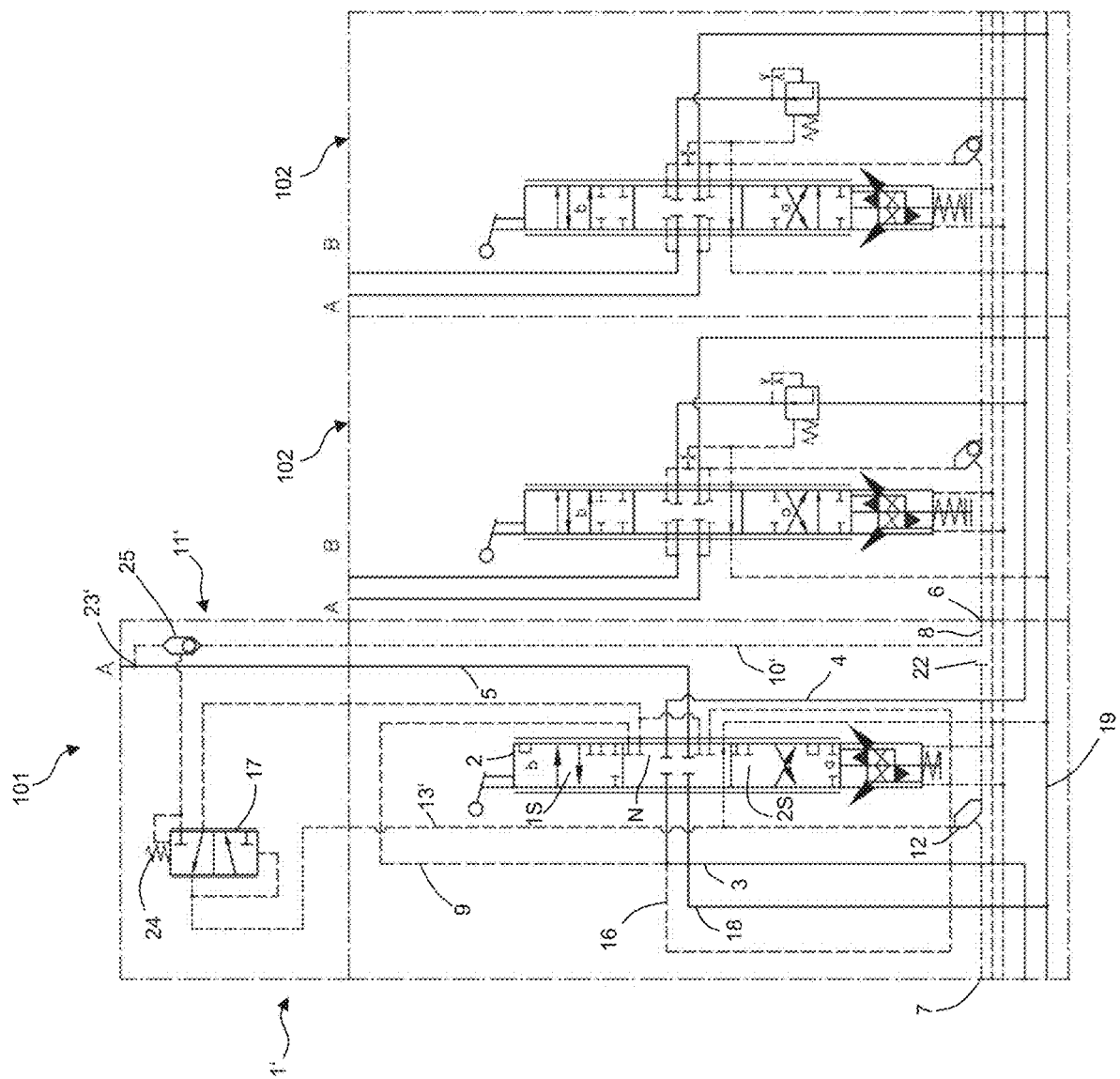
FIG. 8 is a hydraulic circuit diagram of a hydraulic valve assembly according to the invention according to an eighth embodiment.

FIG. 8 shows an eighth embodiment of a hydraulic valve assembly 101 according to the invention, in which the load pressure is also increased in both switching positions 1S and 2S of the spool 2. In this embodiment, the load pressure increasing device 11' also has a copy valve 17 which is controlled via the third load pressure line 10', as described above with reference to FIG. 6. Furthermore, the preselection valve 1' has a fifth load pressure line 16, which branches off from the pressure input line 3 upstream of the spool 2. In the first switching position 1S, the fifth load pressure line 16 is blocked, and in the second switching position 2S, the fifth load pressure line 16 is connected to the load pressure increasing device 11 or the copy valve 17 respectively, in which case the second load pressure line 9 is blocked. A second load pressure inlet 23' is provided as a branch from the second pressure outlet line 4, and is connected to the third load pressure line 10' via a shuttle valve 25. Thus, the higher load pressure, namely either the load pressure applied to the load pressure inlet 8 or to the second load pressure inlet 23', is signaled to the copy valve 17 via the shuttle valve 25. Of course, it is also conceivable that the second load pressure inlet is provided in the end plate 106, as described with reference to FIG. 7.

The invention claimed is:

1. A preselection valve for a hydraulic valve assembly having a switching element, a pressure input line, a first pressure output line, and a first load pressure line with at least one load pressure inlet and at least one load pressure outlet, wherein the switching element can be switched from a neutral position to a first switching position and the pressure input line is connected to the first pressure output line in a first switching position of the preselection valve, the preselection valve comprises:
   a second load pressure line;
   a third load pressure line; and
   a load pressure increasing device for load pressure increase;
   wherein;
      the second load pressure line branches off from the pressure input line upstream of the switching element;
      the load pressure increasing device is connected to the third load pressure line;
      the third load pressure line connects the load pressure increasing device to the first load pressure line;
      the second load pressure line is connected to the load pressure increasing device in the first switching position; and
      the second load pressure line is blocked in the neutral position.

2. The preselection valve according to claim 1, wherein:
   the preselection valve has a fourth load pressure line;
   the load pressure increasing device is connected to the fourth load pressure line; and
   the fourth load pressure line opens into the first load pressure line in a junction.

3. The preselection valve according to claim 2, wherein the load pressure increasing device comprises at least one first hydraulic resistor and a second hydraulic resistor, the at least one first hydraulic resistor having flow applied to it via the switching element and the second hydraulic resistor having flow applied to it via the third load pressure line.

4. The preselection valve according to claim 3, wherein the at least one first hydraulic resistor is adjustable and/or the second hydraulic resistor is adjustable.

5. The preselection valve according to claim 3, wherein the at least one first hydraulic resistor is a nozzle and/or the second hydraulic resistor is a nozzle.

6. The preselection valve according to claim 3, wherein the second hydraulic resistor is disposed in the first load pressure line or in the third load pressure line.

7. The preselection valve according to claim 2, wherein:
   the preselection valve has a fifth load pressure line and a second pressure output line;
   the fifth load pressure line branches off from the pressure input line upstream of the switching element; and
   the switching element is switchable from the neutral position into a second switching position;
   the pressure input line is connected to the second pressure output line in the second switching position of the preselection valve;
   the fifth load pressure line is connected to the load pressure increasing device in the second switching position of the preselection valve;
   the second load pressure line is blocked in the second switching position of the preselection valve; and
   the fifth load pressure line is blocked in the first switching position.

8. The preselection valve according to claim 1, wherein:
   the load pressure increasing device has a copy valve;
   the first load pressure line has a barrier between the load pressure inlet and the load pressure outlet; and
   the third load pressure line branches off from the first load pressure line between the load pressure inlet and the barrier.

9. The preselection valve according to claim 8, wherein the copy valve is a proportional copy valve.

10. The preselection valve according to claim 1, wherein:
    the preselection valve has a second pressure output line;
    the switching element is switchable from the neutral position into a second switching position;
    the pressure input line is connected to the second pressure output line in the second switching position of the preselection valve;
    the second load pressure line is blocked in the second switching position of the preselection valve; and
    the second pressure output line is connected to the first load pressure line in the second switching position of the preselection valve.

11. The preselection valve according to claim 1, wherein:
    the load pressure increase by the load pressure increasing device is dependent on an amount and direction of a deflection of the switching element from the neutral position.

12. A hydraulic valve assembly, comprising:
    a preselection valve according to claim 1; and
    at least one control spool connected to the preselection valve.

13. The hydraulic valve assembly according to claim 12, wherein the hydraulic valve assembly comprises a second load pressure inlet.

14. The hydraulic valve assembly according to claim 13, wherein the second load pressure inlet is connected to the second pressure output line and the load pressure increasing device is selectively connected to the second load pressure inlet or the third load pressure line.

15. A hydraulic control device, comprising:
    a hydraulic valve assembly according to claim 12; and
    a hydraulic pump connected to the preselection valve.

16. A hydraulic valve assembly, comprising:
    a switching element;
    a pressure input line;
    a first pressure output line;
    a first load pressure line with at least one load pressure inlet and at least one load pressure outlet;
    wherein the switching element can be switched from a neutral position to a first switching position and the pressure input line is connected to the first pressure output line in a first switching position of a preselection valve; and
    a preselection valve comprising:
       a second load pressure line;
       a third load pressure line; and
       a load pressure increasing device for load pressure increase;
       wherein;
          the second load pressure line branches off from the pressure input line upstream of the switching element;
          the load pressure increasing device is connected to the third load pressure line;

the third load pressure line connects the load pressure increasing device to the first load pressure line;

the second load pressure line is connected to the load pressure increasing device in the first switching position; and the second load pressure line is blocked in the neutral position.

17. The hydraulic valve assembly according to claim 16, wherein:

the preselection valve has a fourth load pressure line;

the load pressure increasing device is connected to the fourth load pressure line; and the fourth load pressure line opens into the first load pressure line in a junction.

18. The hydraulic valve assembly according to claim 17, wherein the load pressure increasing device comprises at least one first hydraulic resistor and a second hydraulic resistor, the at least one first hydraulic resistor having flow applied to it via the switching element and the second hydraulic resistor having flow applied to it via the third load pressure line.

19. The hydraulic valve assembly according to claim 18, wherein the at least one first hydraulic resistor is adjustable and/or the second hydraulic resistor is adjustable.

20. The hydraulic valve assembly according to claim 18, wherein the at least one first hydraulic resistor is a nozzle and/or the second hydraulic resistor is a nozzle.

\* \* \* \* \*